(No Model.) 3 Sheets—Sheet 2.
G. E. HIBBARD.
MECHANICAL STOKER.
No. 282,519. Patented Aug. 7, 1883.
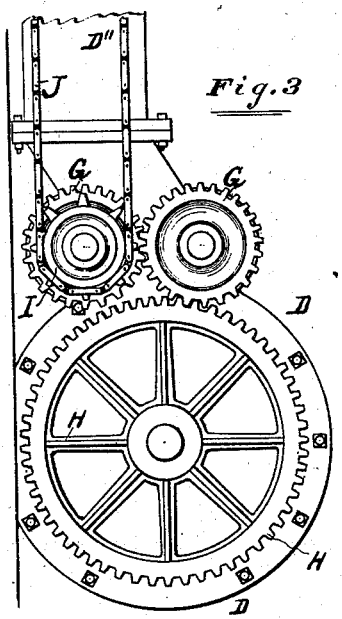
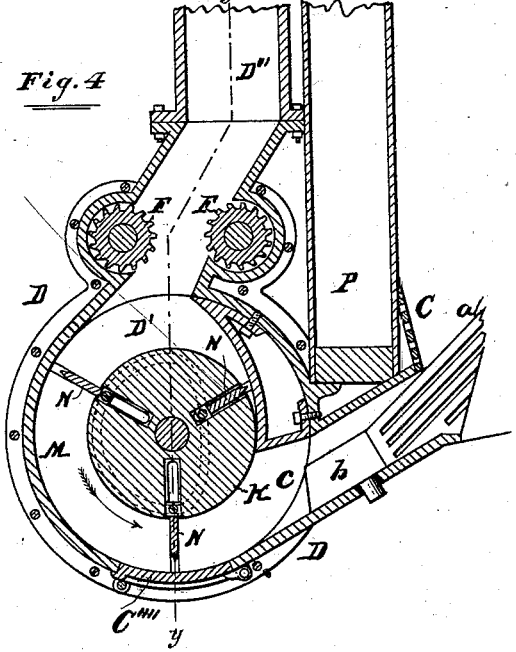
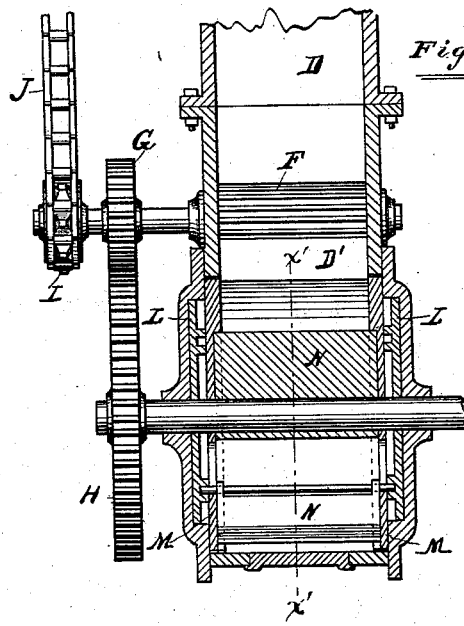
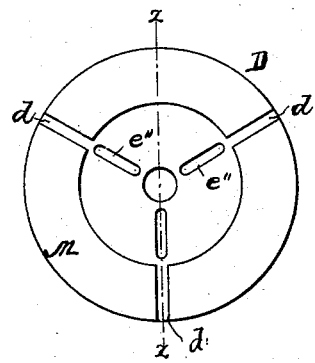
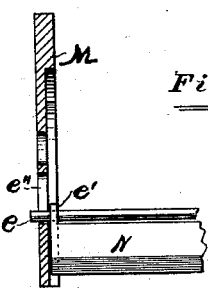
Witnesses,
Harry Frankfurter,
W. L. Baker.
Inventor.
George E. Hibbard.
per Gridley & Co
his Attorneys, (No Model.) 3 Sheets—Sheet 3.
G. E. HIBBARD.
MECHANICAL STOKER.
No. 282,519. Patented Aug. 7, 1883.
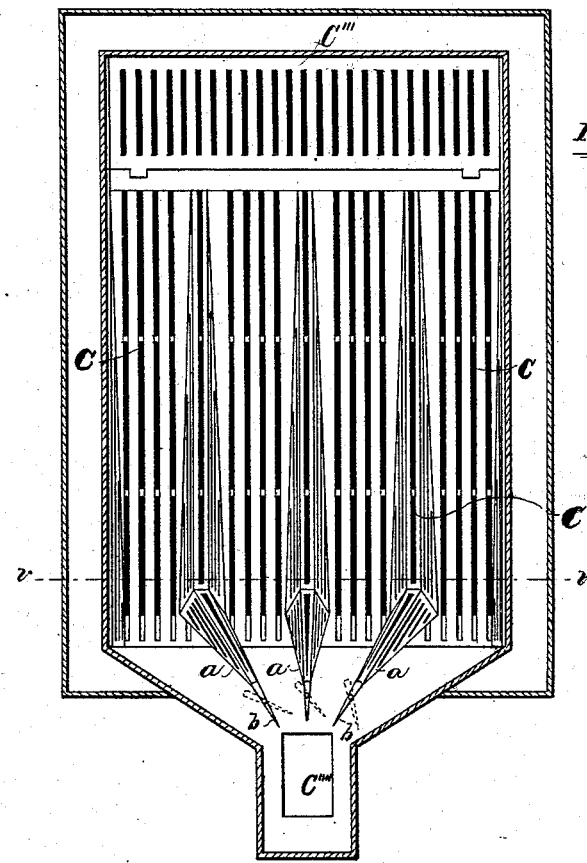
Fig. 11
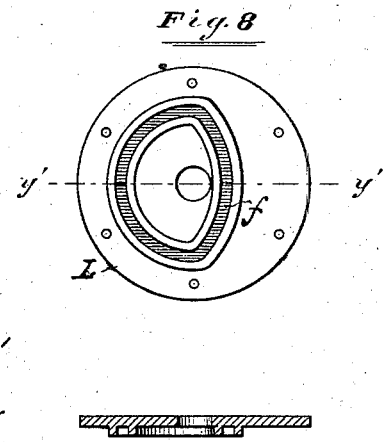
Fig. 8
Fig. 9
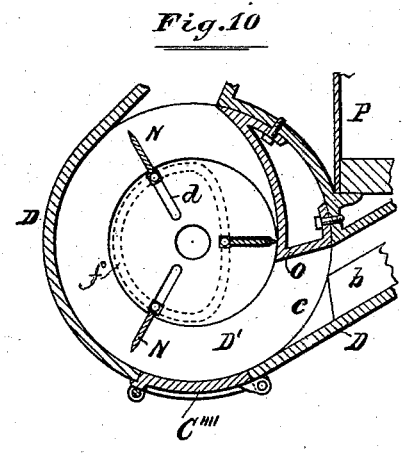
Fig. 10
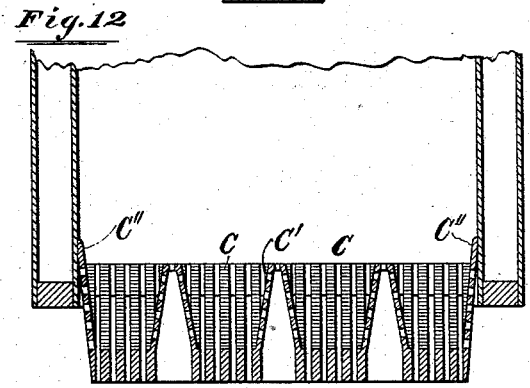
Fig. 12
Witnesses,
Henry Frankfurter,
W. S. Baker
Inventor.
George E. Hibbard,
per. Gridley & Co.
his Attorneys,

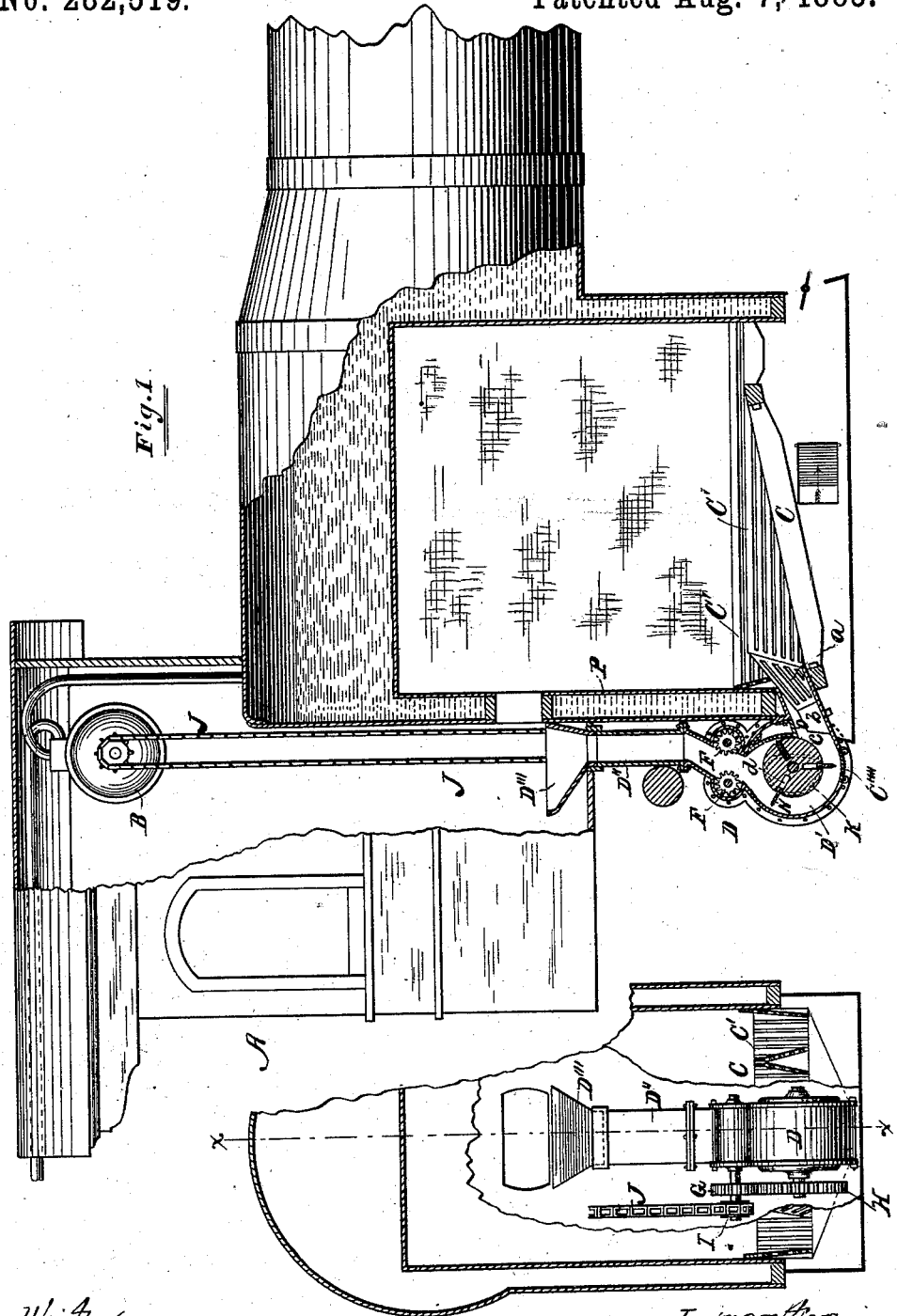

UNITED STATES PATENT OFFICE.

GEORGE E. HIBBARD, OF EVANSTON, ILLINOIS, ASSIGNOR OF ONE-HALF TO NELSON C. GRIDLEY, OF SAME PLACE.

MECHANICAL STOKER.

SPECIFICATION forming part of Letters Patent No. 282,519, dated August 7, 1883.

Application filed April 20, 1883. (No model.)

*To all whom it may concern:*

Be it known that I, GEORGE E. HIBBARD, of Evanston, in the county of Cook and State of Illinois, have invented certain new and useful Improvements in Mechanical Stokers, of which the following, in connection with the accompanying drawings, is a specification.

In the drawings, Figure 1 is a side elevation, shown partly in section, of that part of a locomotive-engine to which I apply my improved stoker. Fig. 2 is a back view of my stoker, shown partly in section, and also showing a part of the engine in section. Fig. 3 is a side view in detail of the stoker. Fig. 4 is a section in the plane of the line $xx$ of Fig. 2. Fig. 5 is a section in the plane of the line $yy$ of Fig. 4. Fig. 6 is a side view of the slotted plate which receives the hub. Fig. 7 is a section in the plane of the line $zz$ of Fig. 6. Fig. 8 is a face view of one of the cam-plates. Fig. 9 is a section in the plane of the line $y'y'$ of Fig. 8. Fig. 10 is a section in the plane of the line $x'x'$ of Fig. 5 when the shaft and hub are removed. Fig. 11 is a horizontal section, showing the top or plan of the grate, and Fig. 12 is a section in the plane of the line $vv$ of Fig. 11.

Like letters of reference indicate like parts.

A represents the cab of a locomotive.

B is a rotary engine.

C is the grate. The grate is inclined, as shown, being lowest at its back or rear end. It also has Λ-shaped or inclined ridges C' C', the tops of which are in a horizontal plane, the said ridges being highest near their rearward ends, and extending from the front to rear portion of the grate and forming a part thereof. The rearward ends of the ridges C' C' are contracted or made tapering, as shown at $a\,a$, and diverge from each other as they extend inward or toward the forward part of the grate.

$b\,b$ are pivoted plates or deflectors arranged directly in front of the contracted parts of $a\,a$.

C'' C'' are side grates tapering from rear to front, and C''' is a rear cross-grate, both of which keep the fuel in place, and keep the incandescent fuel from contact with the lower part of the water-leg, thereby preventing the latter from being injured or there burned out.

C'''' is a dump-trap located at the rear of the grate and in the bottom of the stoker.

D is the stoker, having a drum or chamber, D', entered by a chute or feedway, D'', having a hopper-shaped and removable upper end, D''', located in the cab, as shown. The chamber D' opens upon the rearward end of the grate, as shown at $c$.

F F are crushing-rollers located in the lower end of the chute or feeder, and G G are pinions on the shafts of the rollers F F.

H is a large external cog-wheel engaged by one of the pinions G G, and the wheels G G engage each other, as is clearly indicated in Fig. 3.

I is a sprocket-wheel on the shaft of one of the wheels G G, and J is a drive-chain engaging the said wheel and driven by the engine B. The shaft of the wheel H passes through the chamber D', and carries a hub or cylinder, K.

L L are cam-plates rigidly applied to the inner sides of the shell or wall of the chamber D'.

M M are disks or end plates rotating with the cylinder K.

N N are feed-plates arranged in radial grooves or recesses $d\,d$, extending across the cylinder D, and $e\,e$ are loose pins, lugs, or projections passing through ears $e'\,e'$, extending from the inner corners of the plates N N, and passing through slots $e''\,e''$ in the plates M M. The lugs $e\,e$ enter the grooves $f\,f$ of the cam-plates L L.

O is an abutment in the chamber D'.

P is the water-leg.

The operation of this stoker is as follows: The feeder D'' and hopper D''', I fill with coal and the engine B is set in operation. The coal in passing the rollers F F is crushed, so that it will enter the chamber D' with facility, and so that it may be fed and burned with advantage. As the cylinder K revolves the plates N N push the coal around toward and through the opening $c$ and upon the grate. The abutment O, as will be perceived, is so formed and located as to prevent the coal from entering at that side of the chamber D' which is next to the grate. It also prevents the coal from being pushed out, except through the passage $c$. The plates N N, by reason of the entrance of the lugs $e\,e$ into the groove of the cam L, are withdrawn or retracted into the cylinder K, so as not to strike the abutment O; but the cam L performs the function, also, of throwing out the plates N N after they pass the lower inner corner of said abutment, so that they will push or feed the coal upon the grate in the manner described. The grate, by reason of its raised, tapering, and diverging ridges, distributes the coal properly, and this distribution may be governed or controlled also by means of the pivoted plates $b$ $b$, which may be set or adjusted for that purpose at different angles. The grate, by being inclined and being lowest at its rear end, tends to keep a large mass of incandescent coal at the point at which the coal is fed into the grate. By feeding the coal mechanically in this manner upon an upwardly-inclined grate the smoke and molecules of carbon usually escaping will be consumed more completely than by the usual method of stoking and feeding, and the escape of smoke and cinders will to a great extent, if not wholly, be prevented. The stoker will to some extent assist in supplying the fuel with oxygen or fresh air.

It is to be understood, of course, that the engine B is supplied with steam from the boiler, and exhausts in the tank, as shown, and is under the control of the engineer.

While I have shown my improved stoker in connection with a locomotive-engine, it is obvious that it may be employed with advantage in connection with stationary engines and furnaces.

By using the stoker the necessity of opening the furnace-doors to supply fuel is obviated; also, the usual escape of smoke, soot, and cinders, and the cooling of the boiler and the consequent contraction and expansion of the flue-sheets of the boiler, occasioned by the opening and closing of the doors, are prevented.

In the example shown the hopper D''' is not high enough to interfere with the use of the furnace-doors in the usual manner; but when the hopper D''' would be in the way of so using the doors it may be removed and a trap or cover placed over the opening so exposed. It will also be perceived that by feeding the fuel, in the manner described, directly upon the lower end of an inclined grate the fresh fuel will move upward underneath that which has been partly or imperfectly consumed, and hence that clinkers and other obstructions, which would otherwise clog up the grate and obstruct the draft, will be moved forward to and upon the usual dump-grate, and thence discharged as desired.

Having thus described my invention, what I claim as new, and desire to secure by Letters Patent, is—

1. The combination of the inclined grate C, with its coal-distributing ridges, and a mechanical stoker located for feeding the coal upon the lower end of the said grate, substantially as and for the purposes set forth.

2. The combination of the inclined grate C, side grates, C' C', extending upward from the sides or lateral edges of the grate C, and inclined and tapering at their lower edges to correspond with the inclination of the grate C, and a mechanical stoker located for feeding the coal upon the lower end of the grate C, substantially as shown and described, and for the purposes set forth.

3. The combination of the tapering and diverging grate-ridges $a$ $a$ with a mechanical stoker having a passage or opening, $c$, located in front of the said ridges, substantially as and for the purposes specified.

4. The combination of the inclined grate C, the grate-ridges C' C', the diverging and tapering ridges $a$ $a$, the pivoted plates $b$ $b$, and a mechanical stoker, substantially as and for the purposes set forth.

5. The combination of the inclined grate C, provided with the coal-distributing ridges C' C' and $a$ $a$, with the tapering side grates, C'' C'', substantially as shown and described.

6. The combination of the inclined grate C, provided with the coal-distributing ridges C' C' and $a$ $a$, with the tapering side grates, C'' C'', and cross-grate C''', substantially as shown and described.

7. The combination of the inclined grate C, provided with the coal-distributing ridges C' C' and $a$ $a$, and pivoted plates or deflectors $b$ $b$, with the tapering side grates, C'' C'', substantially as shown and described.

8. The combination of the inclined grate C, provided with the coal-distributing ridges C' C' and $a$ $a$, and pivoted plates or deflectors $b$ $b$, with the tapering side grates, C'' C'', and cross-grate C''', substantially as shown and described.

9. The combination of the inclined grate C, provided with the coal-distributing ridges C' C' and $a$ $a$, and pivoted plates or deflectors $b$ $b$, with the tapering side grates, C'' C'', cross-grate C''', and a mechanical stoker, substantially as and for the purposes specified.

10. The combination, in a mechanical stoker, of the crushing-rollers F F, the revolving and radially-sliding plates N N, and the abutment O, substantially as and for the purposes specified.

11. The combination of the chamber D', the feedway D'', the eduction or opening $c$, the rollers F F, the grooved cylinder K, the sliding plates N N, the plates M M, and the cam-plates L L, substantially as and for the purposes specified.

12. The combination, in a mechanical stoker, of the chute or feedway D'', the chamber D', the passage or opening $c$, the revolving radially-movable plates N N, the abutment O, and the rollers F F, with an inclined grate having its lower end in front of the said opening, substantially as and for the purposes set forth.

GEORGE E. HIBBARD.

Witnesses:
N. COWLES,
HENRY FRANKFURTER.